Aug. 8, 1944.     W. B. ZERN     2,355,603
WOOD WORKING APPARATUS
Filed May 29, 1942     5 Sheets-Sheet 5

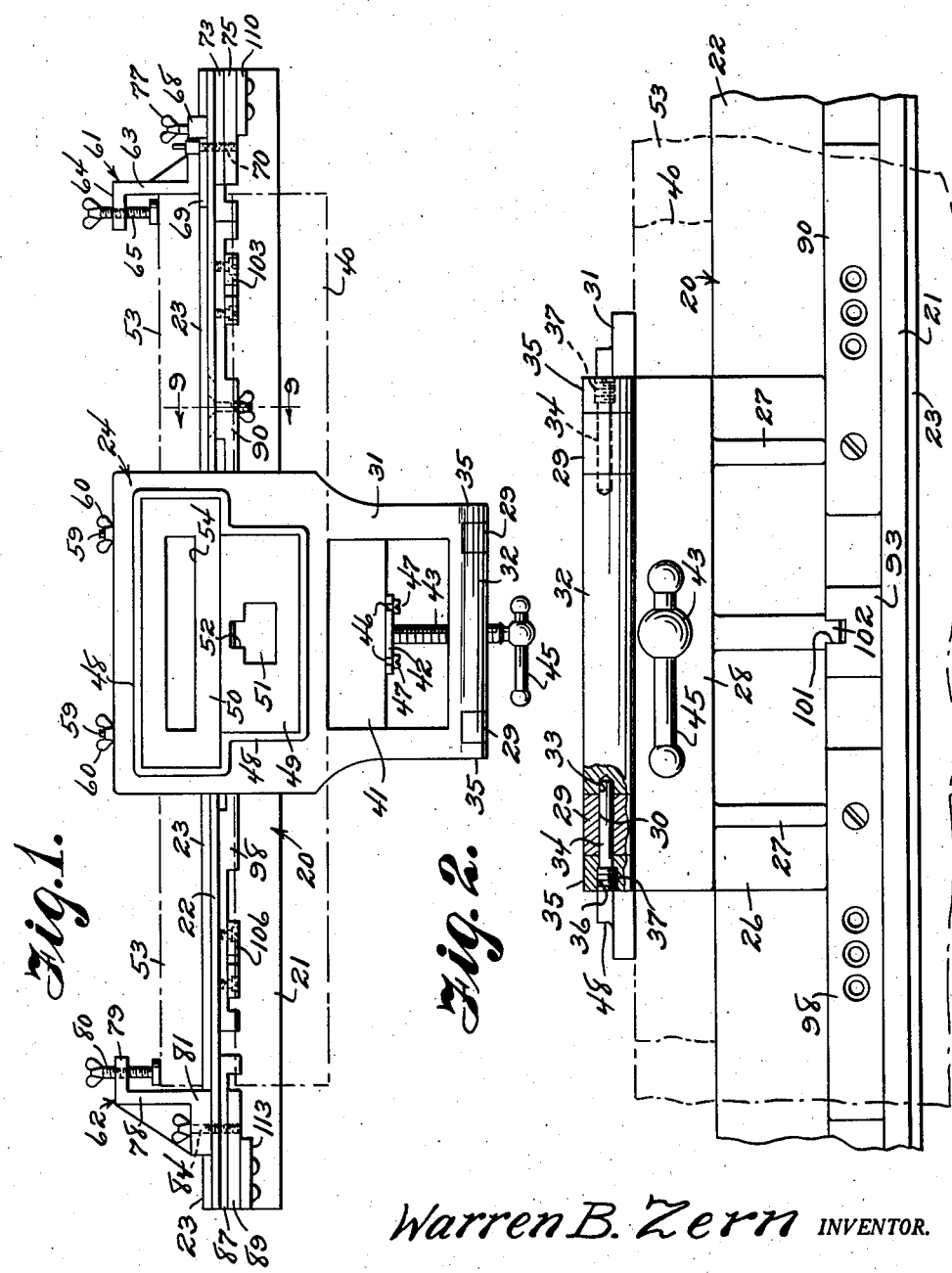

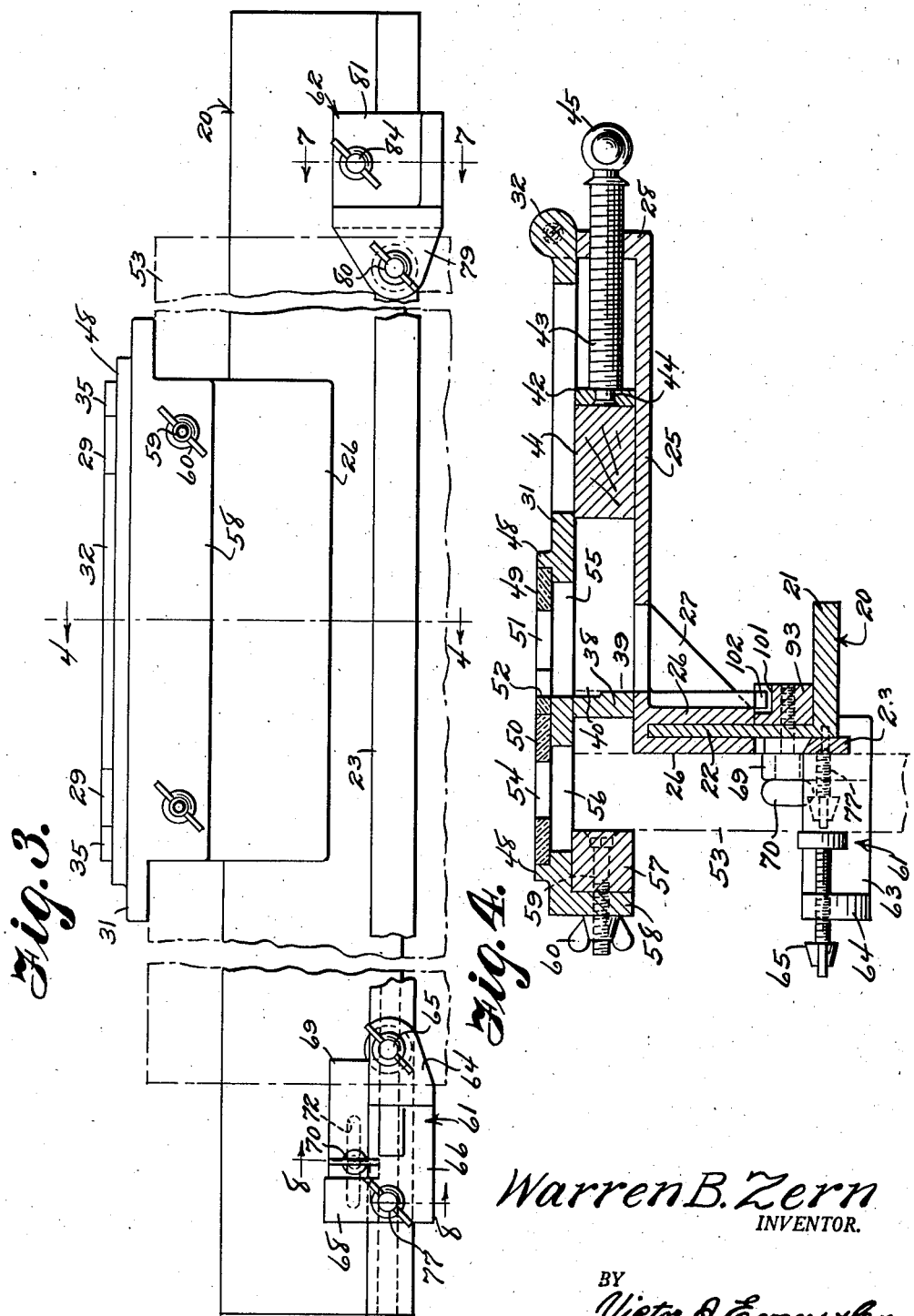

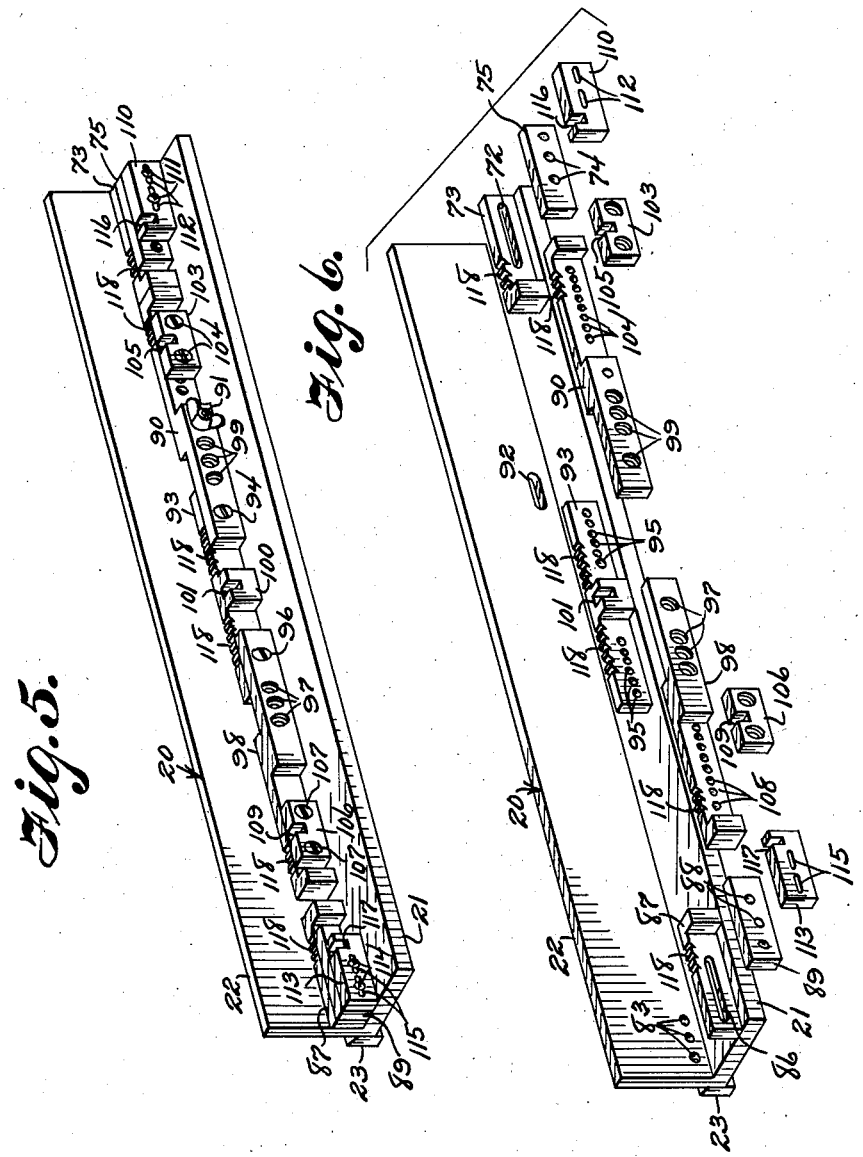

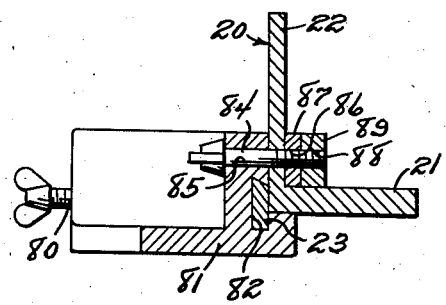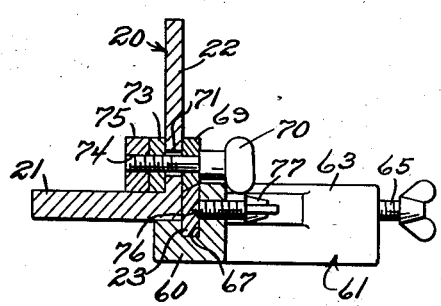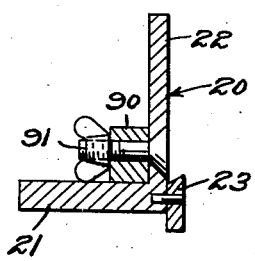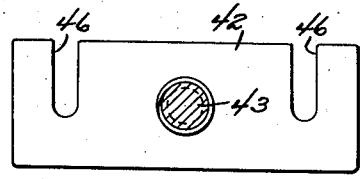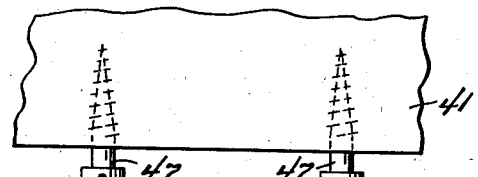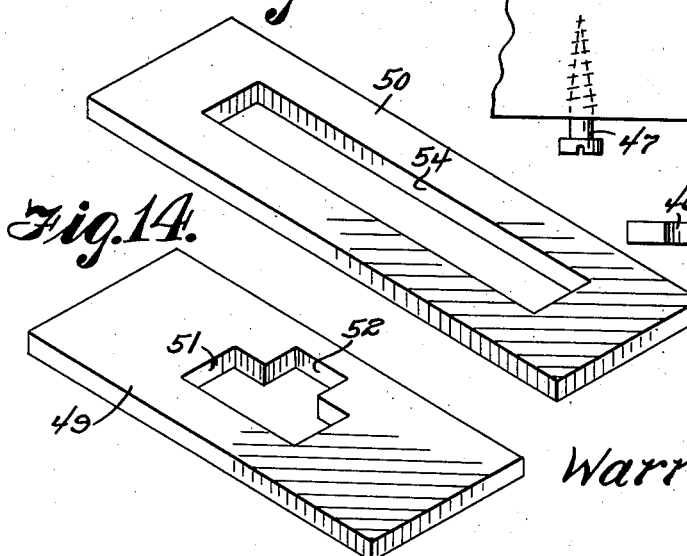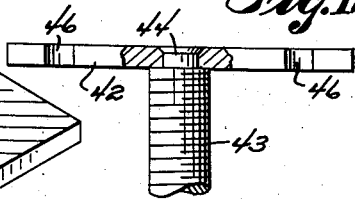

Warren B. Zern
INVENTOR.

BY
Victor J. Evans & Co.
ATTORNEYS

Patented Aug. 8, 1944

2,355,603

UNITED STATES PATENT OFFICE 2,355,603

WOODWORKING APPARATUS

Warren B. Zern, Pottstown, Pa.

Application May 29, 1942, Serial No. 445,049

6 Claims. (Cl. 144—27)

My invention relates to building doors, door frames and the like and has among its objects and advantages the provision of an improved support and gage means to facilitate location of hinge recesses in doors and door frames, lock mortises, keeper plate recesses and the like.

In the accompanying drawings:

Figure 1 is a top view;

Figure 2 is a side view of a portion of the structure of Figure 1 and partly in section;

Figure 3 is a fragmentary face view of the opposite side;

Figure 4 is a sectional view taken along the line 4—4 of Figure 3;

Figure 5 is a perspective view of a gage block assembly;

Figure 6 is a similar view with the blocks separated for the purpose of illustration;

Figure 7 is a sectional view taken along the line 7—7 of Figure 3;

Figure 8 is a sectional view taken along the line 8—8 of Figure 3;

Figure 9 is a sectional view taken along the line 9—9 of Figure 1;

Figure 10 is a face view of a work pressure plate;

Figure 11 is a fragmentary view of a support for the plate of Figure 10;

Figure 12 is a view illustrating an adjusting screw connection for the plate of Figure 10;

Figure 13 is a perspective view of a templet plate employed in cutting a lock mortise;

Figure 14 is a perspective view of a templet plate employed in cutting a keeper plate recess;

Figure 15:
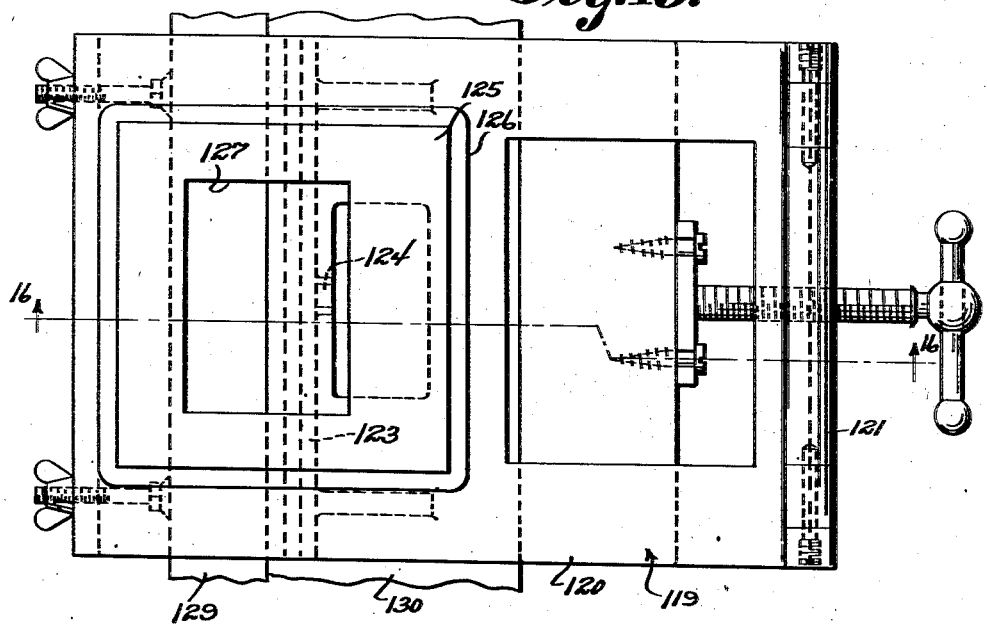
Figure 15 is a face view illustrating a hinge templet in association with a door edge and a door frame member.

In the embodiment of the invention selected for illustration, I make use of a gage mount and tool guide 20 (Figures 3 and 4) in the nature of an angle having a horizontal flange 21 and a vertical angle 22, which angle may be mounted on a suitable structure (not shown). A guide bar 23 is secured to the flange 22 along its bottom edge, this guide bar having its top edge beveled, substantially as shown in Figure 4. Associated with the mount 20 is a templet carrier 24 (Fig. 1). This carrier includes a bottom plate 25 having a channel 26 snugly receiving the flange 22 for supporting the plate 25 horizontally and at right angles to the flange. Reinforcing webs 27 are formed integrally with the plate 25 and the channel 26.

An upstanding flange 28 is formed on the plate 25 along its edge opposite the channel 26 and is provided with two projections 29 having coaxial openings 30, as in Figure 2. A top plate 31, see Figures 1 and 2, is provided with a body 32 fitting endwise between the projections 29 and provided with openings 33 in its ends for the reception of hinge pins 34. Ears 35 are formed on the top plate 31 to fit against the outer end faces of the projections 29 and provided with threaded bores 36 for threaded connection with the screw portions 37 of the hinge pins 34.

To the top plate 31 is attached a spacing flange 38 paralleling the channel 26, see Figure 4. This flange is provided with a positioning face 39 for a door frame piece 40 to be provided with a keeper plate recess. The piece 40 is held in firm engagement with the face 39 by a pressure block 41 actuated through the medium of a plate 42 having one end of a screw 43 rotatably connected therewith, as at 44. This screw is threaded through the flange 28 and is provided with a handle 45.

Figure 10 illustrates the plate 42 as being provided with slots 46 extending through one edge thereof for the reception of screws 47 threaded into the block 41, Figure 11. Thus the block 41 is detachably connected with the plate 42 and may be removed for the substitution of wider or narrower blocks by merely raising the top plate 31 and lifting the block 41. The flange 38 rests on the bottom plate 25 to support the two plates in parallel relationship, with the block 41 sliding freely relatively to the two plates. The flange 38 extends the full width of the top plate 31.

Extending upwardly from the top plate 31 is a flange 48 coacting with the plate to provide a depression for detachably mounting templet plates 49 and 50 with the top plate. Both templet plates preferably comprise fiber board.

Figure 14 illustrates the templet plate 49 as being provided with an opening 51 for a routing tool employed in cutting the keeper plate recess in the frame member 40. The opening 51 is so shaped as to constitute a guide for the routing tool so that the keeper plate recess may be easily contoured to the keeper plate by cutting the recess in conformity with the outline of the opening. The edge 52 on the templet 49 is spaced slightly to one side of the plane of the face 39 so that the routing tool may be caused to intersect the edge of the member 40 for accommodating the lip of the keeper plate.

Figure 4 illustrates the door 53 as lying against the guide bar 23 and vertically beneath an opening 54 in the templet plate 50. This opening constitutes a guide for the routing tool when forming the lock-receiving recess in the edge of the door 53. Openings 55 and 56 are provided in the top plate 31 in registration with the respective openings 51 and 54 to provide ample clearance for the routing tools. With the frame member 40 and the door 53 accurately aligned longitudinally, the keeper plate recess and the lock recess will be accurately positioned, since the openings 51 and 54 are in proper alignment one with the other on the top plate 31.

A door-engaging block 57 is detachably connected with a flange 58 along the free end of the top plate 31. This block is provided with two screws 59 having their heads countersunk in the block and extending through openings in the flange 58 and provided with thumb nuts 60. Thus the block 57 is detachably connected with the flange to facilitate substitution of blocks of different thicknesses in accordance with doors which may vary as to thickness.

The templet plates 49 and 50 have snug fitting engagement with the flange 48 as well as one with the other so as to be held firmly in position. However, either or both templet plates may be easily removed for substituting other templet plates with smaller or larger contour openings therein.

The frame member 40 is easily placed in position, since the top plate 31 is hingedly connected with the bottom plate 25. While the door 53 has its upper edge lying above the bottom plate 25, the top plate 31 swings easily into position.

The door 53 is clamped firmly to the guide bar 23 by clamps 61 and 62 carried by the guide bar 23 and the angle 22. The clamp 61 comprises an arm 63 having a right angular lug 64 through which is threaded a clamp screw 65 for clamping the door 53 against the guide bar 23. To the arm 63 is connected a body 66 (Figure 3) having a groove 67 (Figure 8) for slidably receiving the guide bar 23. This body includes an extension 68 engaging one face of the flange 22 for engagement with a stop 69 lying against that face of the flange and having a beveled offset portion or lip engageable with the oppositely beveled top edge of the guide bar 23. The stop 69 is made secure by a setscrew 70 extending through the stop and through an opening 71 (Figure 8) in the flange 22. The screw 70 extends through a slot 72 in a gage block 73 lying against one face of the flange 22 and is threaded into an opening 74 in a second gage block 75 lying against the gage block 73 to clamp the latter to the flange 22, see Figures 6 and 8. A notch 76 is formed in the guide bar 23 for the reception of the pointed end of a setscrew 77 threaded through the body 68 for fixedly securing the body to the guide bar.

The clamp 62 comprises an arm 78 having a right angular ear 79 through which is threaded a clamp bolt 80 for clamping the door 53 to the guide bar 23. To one end of the arm 78 is attached a body 81 having a groove 82 slidably receiving the guide bar 23. See Figure 7. A plurality of openings 83, see Figure 6, is provided in the flange 22 for selective reception of a bolt 84, see Figure 7, extending through an opening 85 in the body 81. The screw 84 extends through a slot 86 in a gage block 87 lying against the opposite face of the flange 22. This screw is threaded into a bore 88 in a second gage block 89 lying against the gage block 87 to clamp the latter against the flange 22.

The clamp 62 is adjustable longitudinally of the flange 22 by reason of the openings 83 to accommodate the clamp to doors of different lengths. The clamp need not be changed except for doors of longer or shorter lengths. The bottom end of the door 53 lies adjacent the arm 78 of the clamp 62, but is spaced therefrom a distance equal to the clearance desired between the bottom end of the door and the floor. See Figure 1. The top end of the door engages the arm 63 of the clamp 61. While the lugs 64 and 79 extend inwardly of the door 53, the clamp 61 may be shifted sufficiently far longitudinally of the flange 22 to facilitate placement and removal of the door without interference from the clamps.

To the flange 22 is connected a gage block 90 through the medium of a screw 91 extending through a slot 92 in the flange, see Figures 5 and 6. A central gage block 93 is positioned adjacent the flange 22 and is connected with the block 90 by a screw 94. A series of openings 95 is provided in the gage block 93 for selective reception of the screw 94. A second series of openings 95 is provided in the block 93 for selective reception of a screw 96 extending through one of a series of openings 97 in a gage block 98 similar to the gage block 90. A series of openings 99 is also provided in the gage block 90 for selective reception of the screw 94.

A body 100 is formed on the gage block 93 and provided with a notch 101 to receive a lug 102 on the channel 26, see Figures 2 and 4, for locating the templet carrier 24. The block 93 may be adjusted longitudinally of the flange 22 to secure the desired positions of the carrier for locating the mortise guiding templets in necessary positions with respect to the work.

Upon the block 90 is mounted a gage block 103 through the medium of screws 104 selectively receivable in openings in the block 90. A recess 105 is formed in the block 103. A similar gage block 106 is adjustably mounted on the block 98 through the medium of screws 107 selectively receivable in openings 108 in the block 98. A notch 109 is formed in the block 106, the notches 105 and 109 corresponding to the notch 101 but employed in conjunction with the latter for cutting hinge recesses in the door and the door frame member. Upon the gage block 75 is adjustably mounted a gage block 110 through the medium of screws 111 extending through slots 112 in the block 110 and threaded into the block 75. A gage block 113 is mounted on the gage block 89 and adjustably secured thereto by screws 114 extending through slots 115 in the block 113 and threaded into the block 89. A notch 116 is formed in the block 110, while a similar notch 117 is formed in the block 113.

The blocks 73, 87, 90, 93 and 98 are respectively provided with notches 118 which function as scales to facilitate relative location of the parts.

Figure 16:
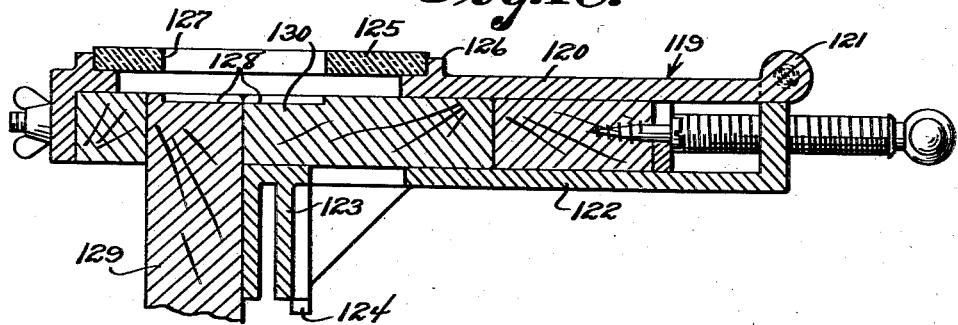
Figure 16 is a sectional view taken along the line 16—16 of Figure 15.
Figure 17:
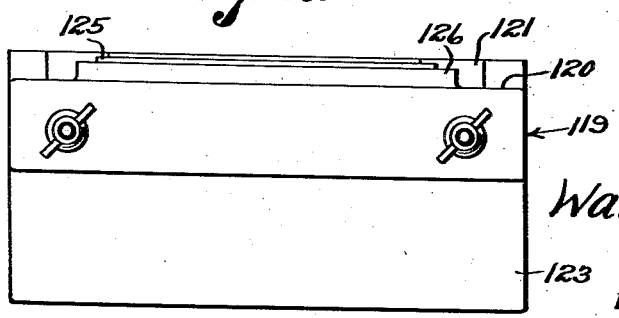
Figure 17 is an end view of the templet carrier of Figures 15 and 16.

In Figures 15, 16 and 17, I illustrate a templet carrier 119 which is identical with the carrier 24 with the exception that the top plate 120 is devoid of the flange 38. The plate 120 is hingedly connected at 121 with the bottom plate 122, the latter being provided with a channel 123 and a lug 124 respectively corresponding to the channel 26 and the lug 102.

Upon the top plate 120 is mounted a hinge templet 125, preferably of fiber composition, detachably retained in a flange 126. This templet is provided with an opening 127 for contouring the hinge recess 128 in the door 129 and the frame member 130. The member 130 is pressed edgewise against one face of the door 129 so that the routing tool may cut both portions of the hinge recess 128 simultaneously.

The middle hinge recess is located by placing the lug 124 in the notch 101 in the block 93, while the end hinge recesses are located through positioning of the lug in the respective notches 105 and 109.

Figure 5 illustrates the block 90 as engaging the block 73, the latter serving as a stop when the door is to be hinged to swing in one direction, while in cases where the hinge recessing operations upon similar doors to be hinged to swing in the opposite direction, the screw 91 is loosened and the blocks 90, 93 and 98 shifted as a unit to the left for engagement with the block 87. All the blocks lie beneath the upper edge of the flange 22 so that either channel 26 or 123 may slide on the flange without interference from the block assembly.

The notches 116 and 117 may be employed to locate a templet (not shown) in position for cutting grooves in door jambs, one or the other of which is used to receive the head member of the door.

The door is accurately cut to length before it is clamped in position. My invention operates to accurately locate the routing tools in predetermined positions and aids in the cutting operations, not only in the matter of precisely locating the various fields of operation, but also as a time saving proposition which reduces the labor cost in a large degree.

While I have illustrated the perfected form of my invention, it is to be understood that the foregoing description is for illustrative purposes only, and I do not desire to be limited by any of the details shown or described, except as defined in the appended claims.

I claim:

1. An apparatus of the type described comprising a work guide member, clamp means for securing a first piece of work to said member, a carrier movable along said member, an abutment for a second piece of work attached to said carrier, a second clamp on said carrier for clamping work against said abutment, tool guiding templets on said carrier for confining the fields of operation of the tools within predetermined areas on the respective first and second pieces of work, and means acting on said member and said carrier for locating the carrier and said templets in a predetermined position on said work.

2. An apparatus of the type described comprising a work guide member, a guide bar on said member, clamp means for securing work to said member having a groove slidably receiving said guide bar, means for releasably locking the clamp means in set position on the bar, a carrier movable along said member and having a tool guiding templet for confining the field of operation of the tool within a predetermined area on the work, and means acting on said member and said carrier for locating the carrier and said templet in predetermined positions on the work.

3. An apparatus of the type described comprising a work guide member having a flange, a guide bar attached to the flange, a first clamp means for securing work to said member provided with grooves slidably receiving said guide bar, screw means for locking the clamp means in set position on the guide bar, a carrier movable along said member, a second clamp means on said carrier for clamping a second piece of work to said first piece of work, a tool-guiding templet on said carrier for confining the field of operation of the tool within a predetermined area on said first and second pieces of work, and means acting on said member and said carrier for locating the carrier and said templet in a predetermined position on said first and second pieces of work.

4. An apparatus of the type described comprising a work guide member, clamp means for securing work to said member, a carrier movable along said member and having a tool-guiding templet for confining the field of operation of the tool within a predetermined area on the work, a plurality of gauge blocks adjustably mounted on said member and with respect to one another, certain of said gauge blocks being provided with recesses, scales on certain of said gauge blocks to indicate relative positional relationships therebetween, and a lug on said carrier selectively receivable in said recesses.

5. An apparatus of the class described, comprising a base-plate adapted to be positioned against one side of a first piece of work, a carrier plate hingedly mounted on said base-plate and normally overlying the same and the top side of said first piece of work, clamp means mounted on said carrier plate and adapted to engage the opposite side of said first piece of work to secure both plates in position, clamp means mounted on said base-plate for securing a second piece of work in juxtaposition to said first piece of work, said second piece of work being supported on said base-plate, in underlying relation to said carrier plate, in its normally cooperative relation to said first piece of work, and tool guiding templates on said carrier plate for confining the fields of operation of a tool within predetermined areas on the respective first and second pieces of work.

6. An apparatus of the class described, comprising a base-plate adapted to be positioned against one side of a first piece of work, a carrier plate hingedly mounted on said base-plate and normally overlying the same and the top side of the first piece of work, clamp means mounted on said carrier plate and adapted to engage the opposite side of said first piece of work to secure both plates in position, a clamp bar movably mounted on said base-plate for securing a second piece of work in juxtaposition to said first piece of work, said second piece of work being supported on said base-plate in its normally cooperative relation to said first piece of work, said clamp bar and said first piece of work underlying said carrier plate, screw means carried by said base-plate for actuating said clamp bar, and tool guiding templates on said carrier plate for confining the fields of operation of a tool within predetermined areas on the respective first and second pieces of work.

WARREN B. ZERN.